United States Patent [19]

Sato et al.

[11] 4,376,727

[45] Mar. 15, 1983

[54] METHOD OF SEPARATING GLOBIN

[75] Inventors: Yasushi Sato; Shigeru Hayakawa, both of Nagoya, Japan

[73] Assignee: The Food Science Institute Foundation, Higashimurayama, Japan

[21] Appl. No.: 225,182

[22] Filed: Jan. 13, 1981

[30] Foreign Application Priority Data

Jan. 29, 1980 [JP] Japan .................................. 55-008261

[51] Int. Cl.³ ........................ A23J 1/06; C07C 103/52
[52] U.S. Cl. .......................... 260/112 B; 260/112.5 R; 260/245.91; 426/647
[58] Field of Search ...................... 260/112 B, 112.5 R

[56] References Cited

U.S. PATENT DOCUMENTS 2,460,550  2/1949  Strumia et al. .................. 260/112 B
2,597,432  5/1952  Beniams .......................... 260/112 B
4,098,780  7/1978  Lindroos ....................... 260/112.5 R

*Primary Examiner*—Howard E. Schain
*Attorney, Agent, or Firm*—Browdy and Neimark

[57] ABSTRACT

This invention relates to a method of separating globin comprising separating hemoglobin from blood of an edible animal, forming an aqueous solution containing 0.5 to 5% of hemoglobin, adding an acid to the aqueous solution to adjust the pH value to 2.0 to 2.2 and the ionic strength to 0.005 to 0.015, bringing the aqueous solution into contact with carboxymethyl cellulose equilibrated with an acidic liquid having a pH value of 2.0 to 2.2 and an ionic strength of 0.005 to 0.015 and then dissolving out globin from the carboxymethyl cellulose with an acidic liquid. The so-obtained dry product of globin is substantially free of haem and it has been found that this dry product is suitable as a protein material for use in processing of foods.

1 Claim, 3 Drawing Figures

METHOD OF SEPARATING GLOBIN

DETAILED DESCRIPTION OF THE INVENTION

The present invention relates to a method of separating globin valuable as a protein material.

Meats obtained from edible animals such as cattle, pig, sheep and chicken are substantially completely utilized effectively as valuable protein sources. However, although blood occupying 7 to 8% of the body weight of an animal contains valuable proteins, it is substantially discarded wastefully.

About 20% of blood is occupied by solids, and proteins occupy more than 80% of the blood solids and in addition, there are contained minor amounts of lipids, saccharides, salts and organic acids.

Blood proteins include serum proteins such as albumin and globulin and globin which is a protein component of hemoglobin in erythrocytes.

Techniques of purifying serum proteins, that is, albumin and globulin, have already been established and isolation and preparation of these serum proteins have already been industrialized. However, the technique of isolating globin which is a protein component of hemoglobin has not been completed because separation of globin from haem is difficult.

We made researches with a view to developing a technique of isolating and purifying globin for effective utilization of globin as a protein material, and we found that globin can be isolated with the use of carboxymethyl cellulose equilibriated with an acid liquid having a pH value of 2.0 to 2.2 and an ionic strength of 0.005 to 0.015.

Figure 1:
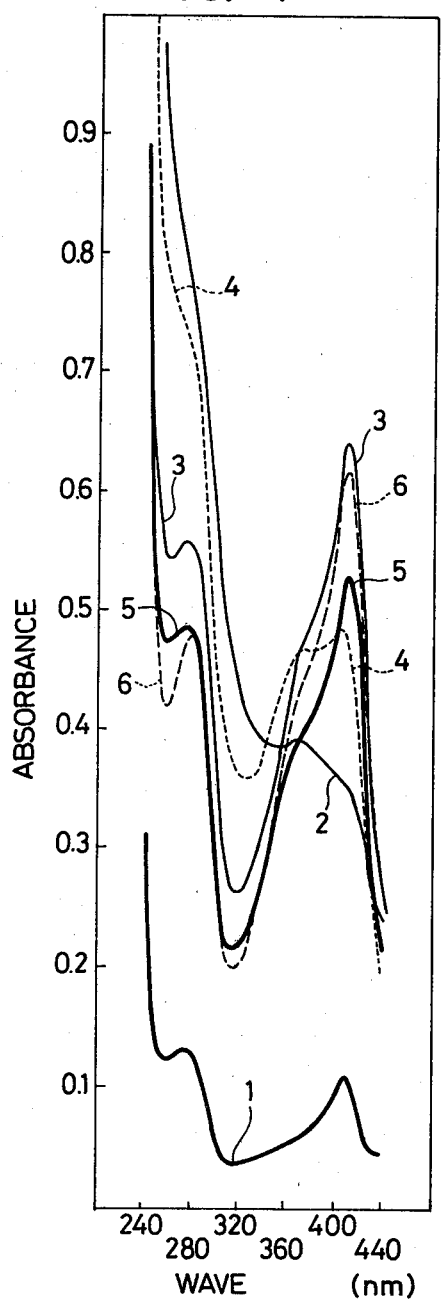
FIG. 1 is a diagram illustrating the globin-separating effects of various ion exchangers at the Test, in which curves 1, 2, 3, 4, 5 and 6 show results obtained by using SP-Sephadex C-50, carboxymethyl cellulose, Amberlite GC-120 Type 1, Amberlite GC-50 Type 2, Dowex 50X-4 and hemoglobin as a control, respectively.

In accordance with the present invention, there is provided a method of separating globin, which comprises separating hemoglobin from blood of an edible animal, forming an aqueous solution containing 0.5 to 5% of hemoglobin, adding an acid to the aqueous solution to adjust the pH value to 2.0 to 2.2 and the ionic strength to 0.005 to 0.015, bringing the aqueous solution into contact with carboxymethyl cellulose equilibriated with an acidic liquid having a pH value of 2.0 to 2.2 and an ionic strength of 0.005 to 0.015 and then dissolving out globin from the carboxylmethyl cellulose with an acidic liquid.

In order to separated and recover haem and globin from blood, it is first of all necessary to separate hemoglobin from blood. When blood is allowed to stand in air, fibrinogen is coagulated in the form of fibrin by the action of slonbin. Coagulated blood is separated into serum and blood clot by centrifugal separation or filtration. Separation of a hemoglobin fraction from blood clot is accomplished by dissolving (hemolyzing) out hemoglobin from erythrocytes by ultrasonic treatment of blood clot, repetition of freezing and thawing, stirring or homogenization of an aqueous suspension of blood clot or addition of saponin. Furthermore, a hemoglobin fraction may be obtained by adding a coagulation-preventing agent such as sodium citrate or heparin to collected blood, subjecting the mixture to centrifugal separation to collect a hemocyte fraction and then subjecting the hemocyte fraction to hemolysis in the same manner as described above.

Water is added to the so obtained hemoglobin fraction to form an aqueous solution having a concentration of 0.5 to 5%. Then, an acid such as sulfuric acid or hydrochloric acid is added to the solution to adjust the pH value to 2.0 to 2.2 and the ionic strength to 0.005 to 0.015, whereby hemoglobin is dissociated into haem and globin.

Separately, carboxymethyl cellulose is packed in a column and an acidic liquid having a pH value of 2.0 to 2.2 and an ionic strength of 0.005 to 0.015 is passed through the packed column to equilibriate the carboxymethyl cellulose. As the acidic liquid having a pH value of 2.0 to 2.2 and an ionic strength of 0.005 to 0.015, there is preferably used 0.01 N hydrochloric acid or sulfuric acid.

The above-mentioned aqueous solution containing 0.5 to 5% of hemoglobin and having a pH value of 2.0 to 2.2 and an ionic strength of 0.005 to 0.015 is passed through the column packed with the equilibriated carboxymethyl cellulose to make haem and globin absorbed in the carboxymethyl cellulose.

Then, an acidic liquid, for example, 0.01 N hydrochloric acid, is passed through the column to obtain an eluate containing globin. Thus, isolation of globin is accomplished.

While globin is dissolved out by the acidic liquid, haem is kept adsorbed in the carboxymethyl cellulose. However, this haem can also be dissolved out by passing through the column an acidic liquid to which sodium chloride is added in an amount of 0.03 to 0.1 mole/l or an alkaline solution having a pH value of 10 to 12, for example, a 0.01 N aqueous solution of sodium hydroxide.

The globin-containing eluate is desalted and the desalted solution is directly concentrated and dried or it is heated after the pH value has been adjusted to 6.8 by addition of 0.5 N NaOH, whereby globin is precipitated. The precipitate is recovered by centrifugal separation and air-dried at 60° C. to obtain a dry product of globin.

The so-obtained dry product of globin is substantially free of haem and it has been found that this dry product is suitable as a protein material for use in processing of foods.

The present invention will now be described in detail with reference to the following Test and Examples.

Test

1. Separation by Aqueous Two-Layer Distribution Method:

A 20% solution of dextran T70, a 40% solution of Carbowax 6000, a 1% solution of hemoglobin in hydrochloric acid (having a pH value of 3) and water were mixed at a ratio of 2/1/1/1. The mixture was shaken in a cylindrical glass vessel and then was allowed to stand still, whereby the mixture was separated into two layers. Some insoluble substances were found present on the surface and the interface between the two layers. Both the upper and lower layers were similarly colored with hemoglobin, and in both the absorption curves of the upper and lower layers measured in the wavelength region of from 240 to 460 nm, there were observed peaks at 280 nm and 420 nm. Accordingly, it was confirmed that globin and haem were not distributed into two different layers independently.

2. Separation by Ion Exchanger:

0.05 g each of (1) SR-Sephadex C-50, (2) carboxymethyl cellulose, (3) Amberlite CG-120 Type 1, (4) Amberlite CG-50 Type 2 and (5) Dowex 50-X-4 as ion exchangers were separately swollen by 10 ml of a glycine salt buffer solution (having a pH value of 3). Then, 3 ml of a 1% hemoglobin solution (having a pH value of 3) was added to the swollen ion exchanger and the mixture was sufficiently shaken, and separated centrifugally. The absorption curve of each supernatant was measured in the wavelength region of 200 to 440 nm to obtain results shown in FIG. 1.

If the absorption at 420 nm is decreased in the supernatant and the absorption at 280 nm is the same as that of hemoglobin, this indicates that only haem is bonded to the ion exchanger and globin can be separated by the ion exchanger.

From the results shown in FIG. 1, it is seen that in the ion exchangers other than carboxymethyl cellulose, both the peaks are present at 280 nm and 420 nm or both the peaks are decreased and there is no possibility of separation of globin.

In contrast, in case of carboxymethyl cellulose, the absorption at 420 nm is drastically reduced, and it is seen that only haemochromogen is adsorbed and globin is isolated.

EXAMPLE 1

100 g of fresh coagulated chicken blood (containing 9.5% of hemoglobin and 4.3% of serum proteins) was subjected to centrifugal separation at 7000 rpm for 15 minutes. Then, 40 ml of a 0.9% aqueous solution of sodium chloride was added to the obtained blood clot to effect re-precipitation, and 40 ml of water was further added and centrifugal precipitation was carried out to obtain washed blood clot.

Then, 200 ml of water was added to the clot and the mixture was subjected to an ultrasonic wave treatment (9K Herz., 1.5 amp., 10 minutes) and then to a centrifugal separation treatment at 7000 rpm for 15 minutes to obtain a hemoglobin solution. Then, 50 ml of water was added to the separated precipitate, and the precipitate was washed by centrifugal precipitation. The washing liquid and 150 ml of water were added to the above hemoglobin solution. The resulting solution was dialyzed to water to effect desalting, and hydrochloric acid was added to the desalted solution so that a 0.01 N solution was obtained.

About 3 g of carboxymethyl cellulose (supplied by Seikagaku Kogyo K.K.) equilibriated with 0.01 N hydrochloric acid was packed in a glass column having an inner diameter of 2.3 cm so that the packing height was 10 cm, and 10 ml of the above-mentioned acidic hemoglobin solution was caused to flow down through the packed column at a linear speed of 0.04 cm/sec and then, 0.01 N hydrochloric acid was caused to flow down through the packed column.

The effluent was collected in the form of 10 ml of a fraction, and absorptions at 280 nm and 420 nm were measured by a photoelectric spectrophotometer. The absorption at 280 nm is one inherent to globin and the absorption at 420 nm is one inherent to haem.

Figure 2:
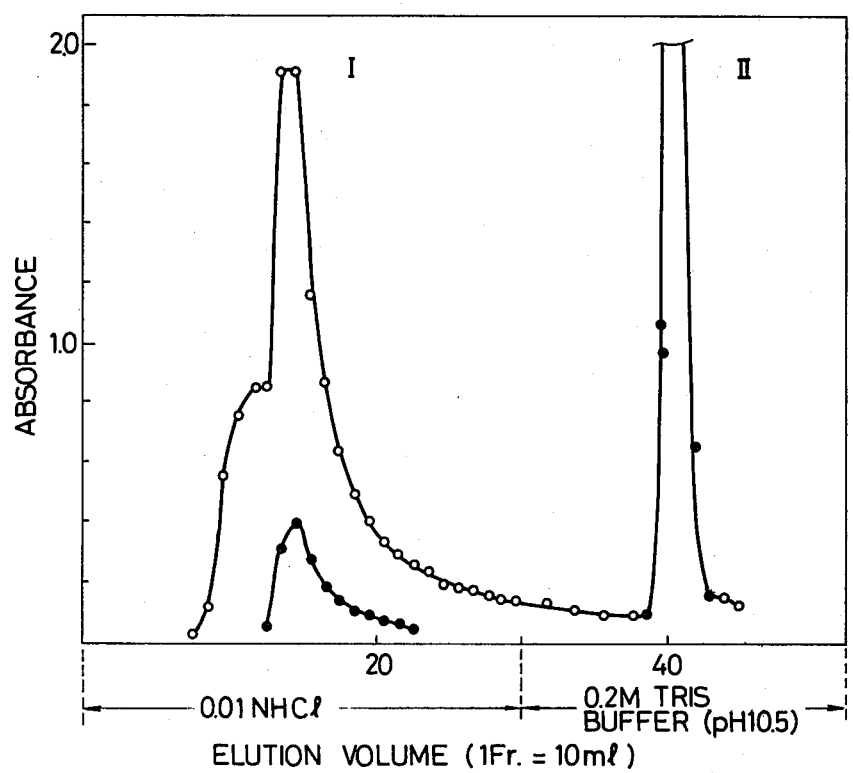
FIG. 2 shows the chicken blood globin-separating effect of carboxymethyl cellulose in Example 1 where 10 ml of a crude chicken hemoglobin solution (containing 180 mg of hemoglobin) was used, in which marks ○ and ● show absorptions at 280 nm and 420 nm, respectively.

The absorption curve of the so collected fraction is shown in FIG. 2. In FIG. 2, the peak I is that of the globin fraction and since the peak I includes a certain absorption at 420 nm, it is seen that a small amount of haem is contained in the globin fraction. However, the presence of such small amount of haem does not cause any problem when this globin fraction is used as a food material. If the fraction of the peak I is subjected to the carboxymethyl cellulose treatment again, haem is completely removed.

The fraction of the peak I was freeze-dried to obtain 184 mg of a dry product of globin having a globin content of 95%, an ash content of 2% and a water content of 3%. The globin recovery ratio was 74% and the yield was 7% based on the coagulated blood.

EXAMPLE 2

2.5 g of cattle blood (having a hemoglobin content of 9.5%) was treated and freeze-dried in the same manner as described in Example 1 to obtain 170 mg of a dry product of globin.

Figure 3:
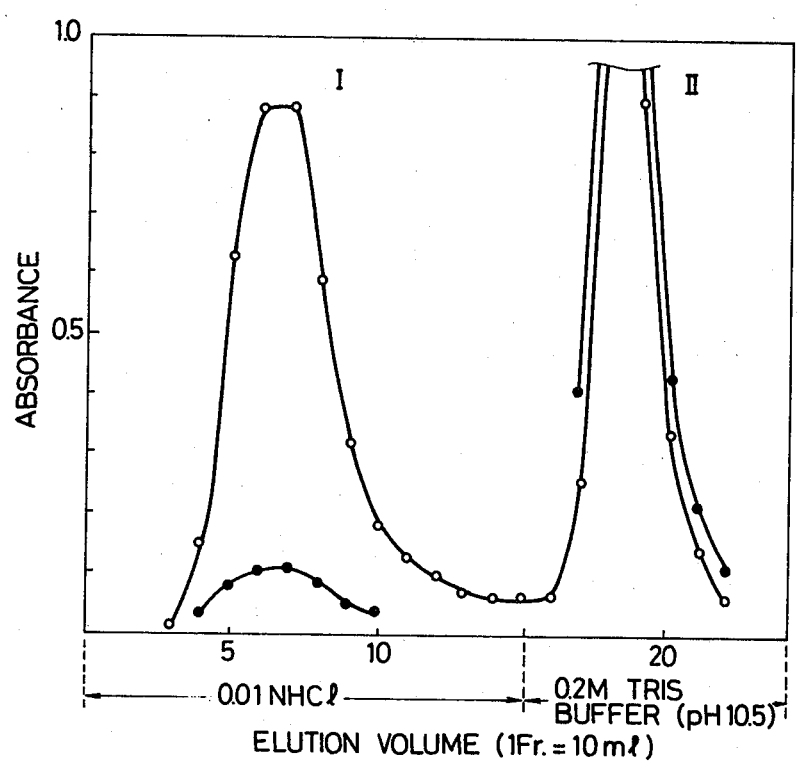
FIG. 3 shows the cattle blood globin-separating effect of carboxymethyl cellulose in Example 2 where 30 ml of a cattle blood hemoglobin solution (containing 50 mg of hemoglobin) was used, in which marks ○ and ● show absorptions at 280 nm and 520 nm, respectively.

The elution state is shown in FIG. 3.

EXAMPLE 3

2.5 g of pig blood (having a hemoglobin content of 11.0%) was treated and freeze-dried in the same manner as described in Example 1 to obtain 205 mg of dry globin.

What is claimed is:

1. A method of separating globin comprising separating hemoglobin from blood of an edible animal, forming an aqueous solution containing 0.5 to 5% of hemoglobin, adding an acid to the aqueous solution to adjust the pH value to 2.0 and 2.2 and the ionic strength to 0.005 to 0.015, bring the aqueous solution into contact with carboxymethyl cellulose equilibriated with an acidic liquid having a pH value of 2.0 to 2.2 and an ionic strength of 0.005 to 0.015 and then dissolving out globin from the carboxymethyl cellulose with an acidic liquid.

* * * * *